Sept. 18, 1945.   H. H. FRIEDEL   2,385,200
METHODS AND APPARATUS FOR REACTING GASES WITH LIQUIDS
Filed June 25, 1942   2 Sheets—Sheet 1

INVENTOR.
Howard H. Friedel
BY
Kenneth E. Stuart
ATTORNEY.

Sept. 18, 1945.  H. H. FRIEDEL  2,385,200
METHODS AND APPARATUS FOR REACTING GASES WITH LIQUIDS
Filed June 25, 1942  2 Sheets-Sheet 2

INVENTOR.
Howard H Friedel
BY
Kenneth E Stuart
ATTORNEY.

Patented Sept. 18, 1945

2,385,200

UNITED STATES PATENT OFFICE 2,385,200

METHODS AND APPARATUS FOR REACTING GASES WITH LIQUIDS

Howard H. Friedel, Niagara Falls, N. Y., assignor to Hooker Electrochemical Company, Niagara Falls, N. Y., a corporation of New York Application June 25, 1942, Serial No. 448,420

6 Claims. (Cl. 260—660)

More particularly my invention relates to a method and apparatus for reacting gases, such as halogens, with liquids, such as hydrocarbons, having foaming characteristics, or reacting therewith to produce a liquid product of foaming characteristics. By "foaming characteristics" is meant properties, such as viscosity and surface tension, resulting in a tendency to form moderately persistent films. A liquid having these properties may be caused to form a layer of foam upon its surface, by bubbling gases upward through it. In the form of a foam, the liquid, of course, presents a relatively enormous surface of contact with the gas. The object of my invention is to utilize this phenomenon in order to secure better contact between the gas and liquid, and hence better absorption of the gas in, or more complete reaction of the gas with, the liquid.

If the liquid reagent itself has foaming characteristics, it may be caused to foam by the bubbling of the gaseous reagent through it, as in the carbonation of caustic soda solutions. If the liquid reagent lacks foaming characteristics, but the product of the reaction is a liquid or solution having such characteristics, as in the chlorination of certain hydrocarbons, also of aqueous suspensions of sodium carbonate, the result may be the same.

In case neither the liquid reagent nor the liquid product normally has foaming characteristics, such characteristics may sometimes be induced by careful temperature control. In other such cases, as in the chlorination of benzene, it may be possible to induce such characteristics by addition of a foaming agent, such as a chlorinated heavier hydrocarbon, which may afterward be readily separated from the volatile product and recycled.

In reactions where there is no gaseous product, as in hydrochlorination of unsaturated hydrocarbons, in order to secure copious foaming it may be necessary to use a considerable excess of the gaseous reagent and recycle the excess.

If there is a gaseous as well as a liquid product, the gaseous product carries with it unreacted gaseous reagent and contacts it with a large and increasing surface of liquid, thus promoting the absorption or reaction. By increasing the height of the liquid column the percentage of gaseous reagent going through unreacted can theoretically be reduced to any desired figure, although in practice it is not in general economical to seek an absorption above 95 per cent.

Since my process depends upon foaming, rather than circulation, for efficient contact of the reagents, it is best carried out in a long slender column. Also, since the gaseous reagent is necessarily introduced at the bottom of the column, and since the foam rises with the gas, my process is preferably operated on the continuous, parallel flow principle; both the gaseous and liquid reagents being introduced at the bottom of the column and the liquid product and gaseous product, if any, being allowed to pass out at the top. Upon standing, the foam of course breaks down into its liquid, which is easily drawn off, while the gaseous product, if any, passes off from above the liquid. Although, as above stated, I do not depend upon circulation, a part of the liquid may be withdrawn as a product and the balance recycled to the bottom of the column, thus combining circulation and foaming in the same process and securing the advantages of both.

In such processes as halogenation of organic liquids, hydrogen halide is generally a by-product. Under given conditions, this occupies the same volume as the gaseous halogen, hence there is no diminution in the volume of the rising gases, due to the reaction. On the contrary, expansion of the gases as they rise increases their volume, and hence the foaming. In the chlorination of sodium bicarbonate, two volumes of $CO_2$ are liberated for one volume of $Cl_2$ used as reagent, and the foaming is copious.

In some cases it may be desirable to divide the column into two sections, passing the liquid from the top of the first to the bottom of the second, introducing the gaseous reagent into the bottom of the second and passing the gases from the top of the second to the bottom of the first. In this way a combination of parallel flow with counterflow operation is secured. Instead of two sections, the reactor may be divided into any desired number of sections or separate columns, interconnected and operated in the same way.

My process is particularly well adapted to continuous chlorination of molten paraffin wax. In this case there is a gaseous product as well as a liquid product and the latter has foaming characteristics. I will therefore describe process and apparatus as applied to the chlorination of molten paraffin wax.

Referring to the drawings.

Figure 3:
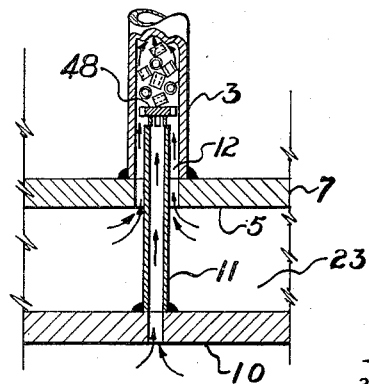
Fig. 3 is an enlarged sectional view of a portion of one of the reactor tubes near the base, where the chlorine and paraffin are admitted.
Figure 1:
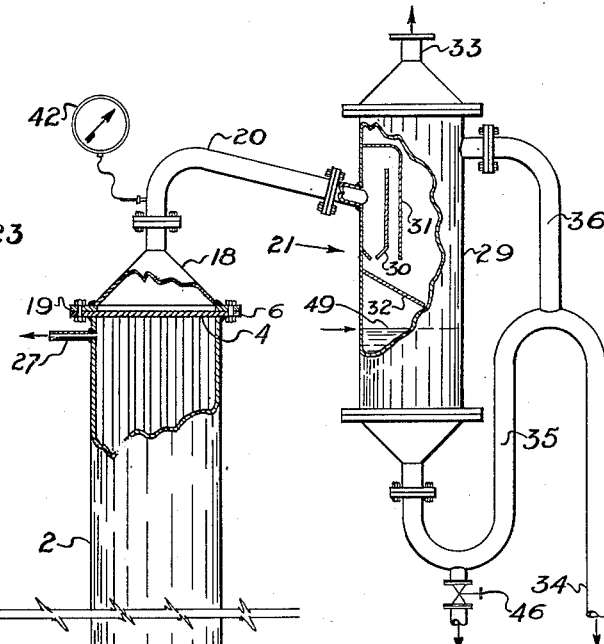
Fig. 1 illustrates my apparatus as used for chlorination of molten paraffin wax, with the essential accessories, the reactor itself being partly in section, showing the tubes, with which it is equipped, in which the actual reaction takes place.
Figure 2:
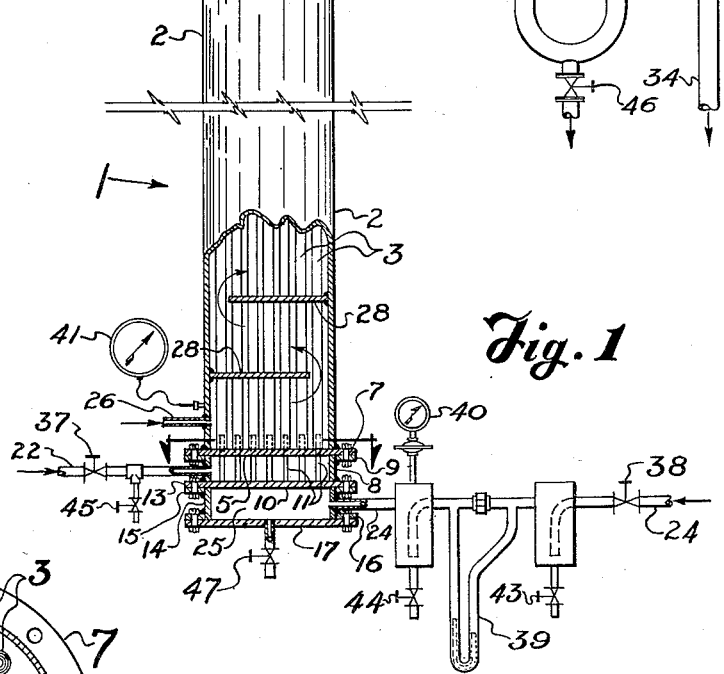
Fig. 2 is an enlarged plan view of my reactor, in section along line a—a of Fig. 1.

Referring to Figs. 1 to 3:

1 is the column reactor, comprising shell 2, housing a battery of reactor tubes 3, 3, extending between and making liquid tight joints at their ends with tube sheets 4 and 5. These extend outwardly beyond shell 2 to form flanges 6 and 7 respectively. Beneath flange 7 and making a liquid tight join therewith is a short section of shell indicated at 8, of the same diameter as shell 2, and provided with flange 9, which is bolted against and makes a liquid tight joint with flange 7. Shell 8 is closed below by tube sheet 10, projecting upwardly from which is a battery of chlorine inlet tubes 11, 11, each entering the lower end of one of tubes 3, and projecting into it for a short distance. Between the outside of tubes 11 and the inside of tubes 3 clearances 12 are provided (Fig. 3). Tube sheet 10 extends outwardly beyond shell 8, to form flange 13. Beneath tube sheet 10 is a second short section of shell, indicated at 14, and provided with flange 15, which is bolted against and makes a liquid and gas tight joint with flange 13. Shell 14 is also provided with flange 16, against which is bolted bottom plate 17, making a liquid tight closure therefor. Above sheet 4 is a conical cover 18, provided with flange 19, which is bolted against and makes a liquid and gas tight joint with flange 6. To cover 18 is connected exit pipe 20, leading to separator 21, to be described later.

Connected to shell 8 is pipe 22, which serves to admit molten paraffin wax to the chamber 23 (Fig. 3), formed between shell 8 and tube sheets 5 and 10. From chamber 23 the molten wax flows through clearances 12, between chlorine tubes 11 and reactor tubes 3, to fill the latter.

Connected to shell 14 is pipe 24, which serves to admit chlorine gas to chamber 25, formed between shell 14, tube sheet 10 and bottom closure plate 17.

Connected to the lower part of shell 2 is pipe 26, serving to admit cooling water to the space within the shell and around tubes 3. Pipe 27, connected to the upper part of shell 2, serves for discharge of the cooling water. The distribution of the cooling water is assisted by baffles 28.

Separator 21 comprises shell 29, provided with inlet baffles 30, 31, and 32, top exit 33 for gas and bottom drawoff 34 for liquid. Drawoff 34 is provided with seal 35, so that it normally stands filled with the liquid to the level defined by this seal. A retention period is thus provided during which the foam breaks down into its liquid. In practice, I find that the separator should be so proportioned that the downward velocity of the body of liquid is one half the upward velocity of the bubbles of gas. Drawoff pipe 34 is vented to the upper part or gas space of the separator by means of pipe 36, so that it cannot form a siphon.

The supply of molten paraffin wax to chamber 23 is controlled by valve 37 and the supply of chlorine to chamber 25 by valve 38. Flow meter 39 and pressure gauge 40 are also provided to aid in the regulation of the flow of chlorine.

41 is a thermometer for recording the temperature of the flowing water and 42 a similar thermometer for recording the temperature of the liquid or foam flowing outward through pipe 20.

43, 44, 45, 46 and 47 are valves controlling pipes adapted to drain the chlorine and paraffin systems and separator respectively.

The space within the reactor tubes 3 may be open, but I have found that it is preferably packed with contact material, such as Raschig rings, as indicated in Fig. 3. I have also found that the reaction is promoted if this material is of activated carbon. In order to prevent this material from obstructing tubes 11, the ends of these tubes are protected by caps 48, which may be supported upon the ends of tubes 11 by spiders as shown.

The operation of the apparatus just described is as follows:

Water at about 90° C. is admitted through pipe 26, filling the space within shell 2, and flowing out by tube 27. Tubes 3 are thus preheated. Paraffin wax, melted in a receptacle not shown, is admitted through pipe 22 to chamber 23, whence it flows upward into tubes 3 through annular spaces 12 between these tubes and chlorine tubes 11. Gaseous chlorine is admitted through pipe 24 to chamber 25, whence it flows upward through tubes 11, mingling with the molten paraffin. The paraffin being hot, the chlorine immediately reacts with it, generating hydrogen chloride. The chlorine and hydrogen chloride mingle and produce a gas lift, raising the paraffin in tubes 3. As the bubbles of gas rise, they occupy an increasingly large proportion of the space within tubes 3, until the space within the tubes becomes completely filled with foam partly composed of unreacted paraffin. This foam presents a relatively enormous surface to the gases. As the foam rises, the percentage of reagents diminishes and the percentage of reaction products increases, until at the very top small proportions of the reagents remain unreacted.

The admission of molten paraffin is regulated in any convenient manner, as by noting the diminishing weight of the receptacle in which it is stored (not shown) or by metering in any other convenient manner. The admission of chlorine is regulated to correspond, by means of flow meter 39. For production of chlorinated paraffin wax of 42 percent chlorine content by weight, the theoretical ratio of wax to chlorine is 1 to 0.84; but for optimum results there should be a slight excess of chlorine over the theoretical, as represented by the ratio of 1 to 1. The admission of cooling water is regulated in accordance with its temperature, as indicated by thermometer 41, to maintain the liquid reagent and product at the optimum temperature for the reaction and for foaming, as indicated by thermometer 42. In practice, I find that the water should be admitted at not less than 85° C., otherwise the reaction is liable to cease. I also find that the flow should be so adjusted that the water will issue at a temperature just below its boiling point. In this way the temperature of reaction is kept at about 110° C. This temperature is quite critical, as the product tends to darken at 120° C. and liable to ignite at 160° C.

In separator 21, baffles 30, 31 and 32 serve to prevent the foam from being carried out of exit 33 by entrainment. The foam therefore collects in the lower part of the separator, and after it has broken down, the liquid forms a body at level 49 below the foam and flows out through pipe 34. With the reagents admitted continuously through pipes 22 and 24, the liquid product flows out continuously through pipe 34 and the gaseous product continuously through exit 33.

Hitherto nothing has been said about the proportions of reactor tubes 3, but for the best results these are quite critical. I have found that for most efficient results there are maximum and minimum limits of diameter for the tubes as well as maximum and minimum limits of length. The optimum length is to some extent related to the diameter and to some extent independent. The effective mingling of the chlorine with the paraffin at the bottom of the column is of course an essential consideration. This is promoted by co-relating chlorine inlet tube 11 to reactor tube 3, so that there is an entrainment of the liquid by the gas. This effect cannot be secured with tubes of large diameter. For this reason I prefer a relatively large number of small tubes rather than the reverse. On the other hand, the smaller tubes offer greater resistance to flow, which cuts down the capacity of the apparatus for a given total cross sectional area of tubes of given length. These considerations fix the limits of tube diameter at from ½ inch to 3 inches. Time of contact between the gas and liquid is also an essential factor. For tubes of a given diameter this is a function of length. That is to say, the larger the tube, the higher the practicable velocity of flow of both liquid and gas in it, and hence the longer it must be to give effective time of contact. These and other practical considerations fix the limits of length at 10 to 16 feet. After extensive experimentation, I have ascertained that the optimum diameter of the reactor tubes is ¾ inch and the corresponding optimum length 16 feet. With a reactor of these proportions the space velocity should not be greater than the cubic capacity of the reactor per minute.

Figure 4:
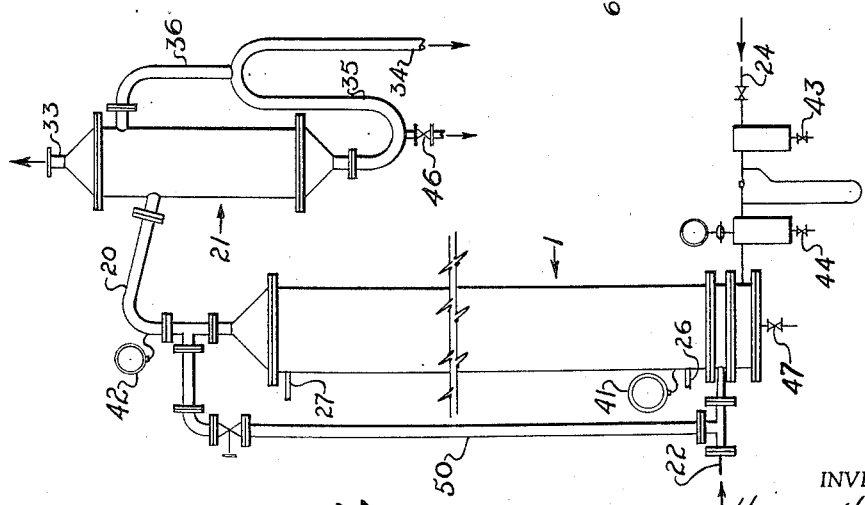
Fig. 4 illustrates a method of recycling a part of the liquid product, to combine circulation with foaming.

Referring to Fig. 4:

In this figure, which is to a reduced scale, the exit from reactor 1 is divided and a portion of the liquid product recycled to the base of reactor 1 through pipe 50. This of course augments the upward flow through the reactor tubes, so that the proportion of the liquid drawn off and retained as finished product comes to correspond in quantity to the reagents introduced through pipes 22 and 24. In this way an effect equivalent to circulation of the liquid in the reactor is secured and the efficiency of absorption improved.

Figure 5:
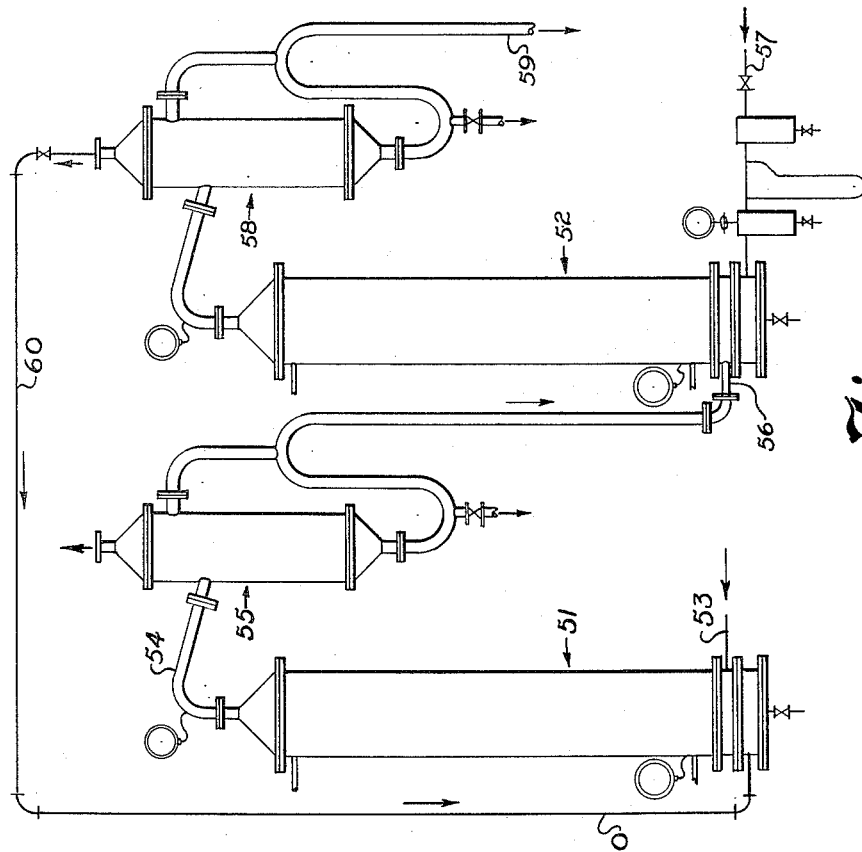
Fig. 5 illustrates a method of interconnecting two of my chlorination reactors to obtain the advantages of counterflow reaction.

Referring to Fig. 5:

In this figure 51, 52 are two reactors, each similar to that illustrated in Figs. 1 to 3, though shorter. Molten paraffin wax is admitted to reactor 51 through pipe 53. The partially reacted liquid issues from reactor 51 through pipe 54 which is connected to separator 55. The liquid from separator 55 is delivered to paraffin inlet 56 of reactor 52. Gaseous chlorine is admitted to the base of reactor 52 through pipe 57. The foam leaving reactor 52 is delivered to separator 58, whence the finished product is delivered through pipe 59. The gas separated out from the foam in separator 58, consisting of a mixture of hydrogen chloride and unreacted chlorine, is delivered to the base of reactor 51 through pipe 60. The gas separated from the liquid in separator 55 is largely hydrogen chloride and is discharged from the system as gaseous by-product.

It will be noted that instead of two reactors I could use any practicable number similarly interconnected. By this method of interconnecting my reactors I therefore secure the benefits of foam phase chlorination, which depends upon parallel flow, and at the same time of counterflow reaction, by which the foam that is nearing the end point of the reaction, and therefore sluggish with respect to the chlorine, is brought into contact with fresh concentrated chlorine.

I claim as my invention:

1. The process for reacting a gaseous with a liquid reagent to produce a gaseous product and a liquid product having foaming characteristics which comprises introducing the gaseous reagent in the form of a jet upwardly directed at the bottom of and substantially co-axially with respect to an elongated column reactor open at its top but otherwise closed except for an annular space around the jet and having an internal diameter of one-half inch to three inches and a height of ten to sixteen feet, and introducing the liquid reagent into the annular space, while regulating the velocity of the jet and admission of the liquid reagent, and at the same time controlling the temperature of the materials within the column by heat transfer to cooling liquid through the walls thereof, to cause foaming reaction within the column and discharge of the resulting foam out at its top into a separator; allowing the foam to stand and break down and recovering the liquid product from the gases associated therewith.

2. The process for reacting a gaseous with a liquid reagent to produce a gaseous product and a liquid product having foaming characteristics which comprises introducing the gaseous reagent in the form of a jet upwardly directed at the bottom of and substantially co-axially with respect to an elongated column reactor open at its top but otherwise closed except for an annular space around the jet and having an internal diameter of one-half to three inches and a height of ten to sixteen feet, and introducing the liquid reagent into the annular space, while regulating the velocity of the jet and admission of the liquid reagent, and at the same time controlling the temperature of the materials within the column by heat transfer to cooling liquid through the walls thereof, to cause foaming reaction within the column and discharge of the resulting foam out at its top into a surmounting retention chamber and thence through an exit above the level of said top into a separator; allowing the foam to stand and break down and recovering the liquid product from the gases associated therewith.

3. The process for chlorinating liquid paraffin hydrocarbons to produce hydrogen chloride and a liquid product having foaming characteristics which comprises introducing chlorine in the form of a jet upwardly directed at the bottom of and substantially co-axially with respect to an elongated column reactor open at its top but otherwise closed except for an annular space around the jet and having an internal diameter of one-half to three inches and a height of ten to sixteen feet and introducing the liquid paraffin into the annular space, while regulating the velocity of the jet and admission of the liquid reagent, and at the same time controlling the temperature of the materials within the column by heat transfer to cooling liquid through the walls thereof, to cause foaming reaction within the column and discharge of the resulting foam out at its top into a separator; allowing the foam to stand and break down and recovering the liquid product from the gasses associated therewith.

4. The process for chlorinating paraffin wax to produce a product containing up to substantially 42 per cent chlorine which comprises introducing the chlorine in the form of a jet upwardly directed at the bottom of and substantially coaxially with respect to an elongated column reactor open at its top but otherwise closed except for an annular space around the jet and having a diameter of substantially one-half inch and a height of substantially sixteen feet and introducing the molten paraffin into the annular space, while regulating the velocity of the jet and admission of the liquid reagent to maintain a substantially equal weight ratio of the reagents, and at the same time controlling the temperature of the materials within the column by heat transfer to cooling liquid through the walls thereof, to maintain a temperature of 85° to 110° C. and cause foaming reaction within the column and discharge of the resulting foam out at its top, at a space velocity not exceeding the cubic capacity of the column per minute, into a separator; allowing the foam to stand and break down, and recovering the liquid product from the gases associated therewith.

5. The process for chlorinating a liquid olefin to produce a liquid product having foaming characteristics which comprises introducing a gaseous chlorinating agent of the group consisting of chlorine and hydrogen chloride in the form of a jet upwardly directed at the bottom of and substantially co-axially with respect to an elongated column reactor open at its top but otherwise closed except for an annular space around the jet and having an internal diameter of one-half inch to three inches and a height of ten to sixteen feet and introducing the olefin into the annular space, while regulating the velocity of the jet and admission of the olefin, and at the same time controlling the temperature of the materials within the column by heat transfer to cooling liquid through the walls thereof, to maintain a large excess of chlorinating agent and cause foaming reaction within the column and discharge of the resulting foam out at its top into a separator; allowing the foam to stand and break down and recovering the liquid product from the excess chlorinating agent and recycling the latter.

6. The process for reacting a gaseous with a liquid reagent to produce a liquid product lacking foaming characteristics which comprises mixing it with a liquid miscible therewith, inert with respect to the reaction and having foaming characteristics which comprises introducing the gaseous reagent in the form of a jet upwardly directed at the bottom of and substantially co-axially with respect to an elongated column reactor open at its top but otherwise closed except for an annular space around the jet and having an internal diameter of one-half inch to three inches and a height of ten to sixteen feet and introducing the liquid mixture into the annular space, while regulating the velocity of the jet and admission of the mixture and at the same time controlling the temperature of the materials within the column by heat transfer to cooling liquid through the walls thereof, to cause foaming reaction within the column and discharge of the resulting foam out at its top into a separator; allowing the foam to stand and break down and recovering the liquid product from the gases associated therewith and foaming agent.

HOWARD H. FRIEDEL.